United States Patent [19]

Ricard

[11] Patent Number: 4,998,205

[45] Date of Patent: Mar. 5, 1991

[54] METHOD AND APPARATUS FOR INSERTING DATA INTO ELECTRONIC TAXIMETERS FROM A CENTRAL COMPUTER TEMPORARILY CONNECTED TO A LOCAL TERMINAL

[76] Inventor: Claude F. Ricard, Villa Sainte Madeleine - 52, Cours Gambetta 13100 AIX-en-Provence, France

[21] Appl. No.: 227,867

[22] Filed: Aug. 2, 1988

[30] Foreign Application Priority Data

Aug. 7, 1987 [FR] France .................................. 87 11390

[51] Int. Cl.$^5$ .............................................. G07B 13/08
[52] U.S. Cl. .................................. 364/467; 235/30 R; 235/30 A; 235/33
[58] Field of Search ...................... 235/30 R, 30 A, 33; 364/467

[56] References Cited

U.S. PATENT DOCUMENTS

| T104,003 | 3/1984 | Hall et al. ............................. 364/200 |
| 4,104,721 | 8/1978 | Markstein et al. ................... 364/200 |
| 4,167,040 | 9/1979 | Heritier et al. .................. 364/467 X |
| 4,240,146 | 12/1980 | Iles ......................................... 364/467 |
| 4,539,644 | 9/1985 | Adams et al. ......................... 364/467 |
| 4,752,950 | 6/1988 | Le Carpentier ........... 364/464.02 X |

FOREIGN PATENT DOCUMENTS

| 0065662 | 12/1982 | European Pat. Off. . |
| 208231 | 1/1987 | European Pat. Off. . |
| 1519721 | 8/1978 | United Kingdom . |
| 1586557 | 3/1981 | United Kingdom . |
| 1602274 | 11/1981 | United Kingdom ................ 364/467 |

*Primary Examiner*—Parshotam S. Lall
*Assistant Examiner*—Edward R. Cosimano
*Attorney, Agent, or Firm*—Ladas & Parry

[57] ABSTRACT

In order to introduce data, and in particular charging data, into the memory of a taximeter, the taximeter is connected to an adaptor which is in turn connected to the I/O connector of a local terminal which is connected to a central computer over a telecommunications network. The adaptor includes a microprocessor which is programmed to recognize the nature of the packets of data received from the central computer, to transcode the data, and to transfer the data into the taximeter memory.

5 Claims, 2 Drawing Sheets

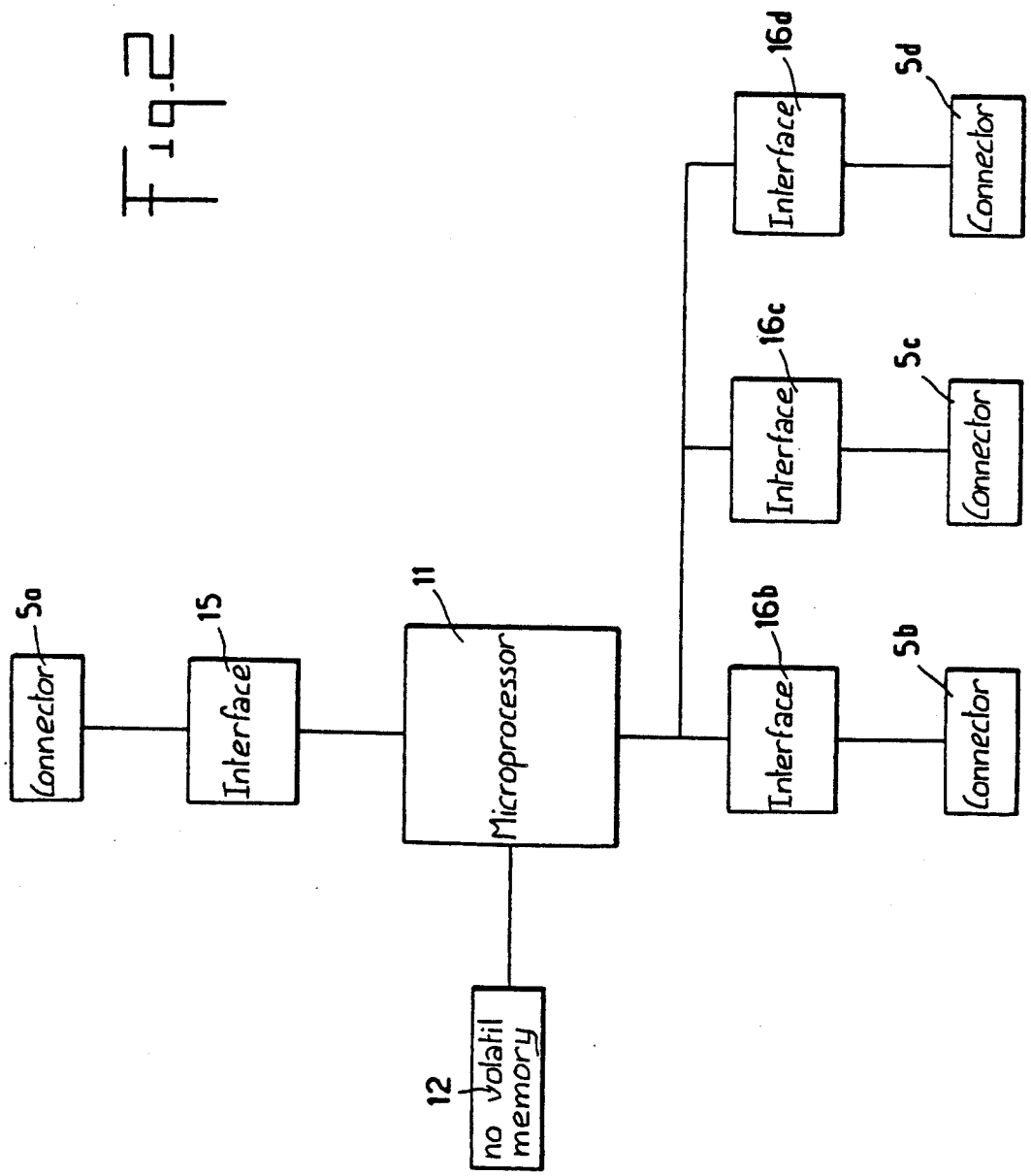

METHOD AND APPARATUS FOR INSERTING DATA INTO ELECTRONIC TAXIMETERS FROM A CENTRAL COMPUTER TEMPORARILY CONNECTED TO A LOCAL TERMINAL

The present invention relates to an adaptor method and apparatus for inserting data into electronic taximeters from a central computer temporarily connected to a local terminal.

The technical field of the invention is the construction and programming of electronic taximeters.

BACKGROUND OF THE INVENTION

Electronic taximeters are known including a microprocessor and volatile working memory which is backed up by a permanent supply of D. C., said memory containing, in particular, unit prices for taxi occupation time and for distance traveled, on the basis of which the microprocessor calculates the cost of a trip.

These prices vary from one place to another, and within a given location they need updating frequently.

Programming boxes are known which contain a computer unit and memories into which new charging data is inserted. Each taximeter includes input/output (I/O) connectors enabling it to be connected to I/O connectors on the programming box, and the external computer unit contained therein is programmed to communicate with the taximeters using a specific dialog protocol. During the dialog, the external computer unit clears the working memory of the taximeter connected thereto and transfers new charging data therein taken from its own memory.

PLESSEY's French Pat. No. FR 76/37,706 (published under the U.S. Pat. No. 2,335,892) describes taximeters and an apparatus for loading them, said apparatus including a microprocessor, a keyboard, memories, and an interface circuit enabling successive taximeters to be connected to the charging apparatus and enabling charging data to be transferred into the taximeters.

The use of programming boxes or apparatuses for loading taximeters with charging data is under the control of official bodies whose task is to monitor measuring and charging apparatuses and such use is authorized only for said bodies or for persons authorized thereby.

This solution requires a large number of programming boxes to be constructed, e.g. one or more per large town, together with accurate surveillance of the way in which they are used.

When programming boxes are numerous, there is an increase chance of fraud by non-authorized persons, who may be able to obtain a programming box and use it to insert increased unit prices into taximeters.

The object of the present invention is to provide means which are cheaper and more secure for reprogramming all of the taximeters within the jurisdiction of a given authority.

Telecommunications networks exist, such as the TRANSPAC network, which enable so-called "server" central computers to be called from telephone sets which are associated with local terminals, e.g. terminals including a keyboard, a display screen, and a "modem", i.e. a modulator-demodulator enabling binary signals to be transmitted over telephone lines in the form of audio frequencies compatable with such lines.

A terminal may be constituted, for example, by a small computer equipped with a "modem". Once a connection has been established, the server sends packets of information to the local terminal and the local terminal may display the information on its screen.

As a general rule, a local terminal (whether a dedicated telecommunications terminal or a computer fitted with a modem) includes an interface fitted with an I/O connector suitable for connection to a printer for printing the information which appears on the screen.

The user of such a network dials a number using a telephone set which puts the user in communication with the network. The user then keys in a code on the keyboard of the terminal to be connected to a given server. Thereafter, the user may need to key in a password specific to the user in order to enable the server to identify the caller so that the services provided may be billed.

All the above is well known.

SUMMARY OF THE INVENTION

The present invention provides a method of entering data, in particular charging data, into electronic taximeters, wherein a table of said data corresponding to various different towns is recorded in the memory of a central computer which is accessible over a telecommunications network, wherein taximeters are connected one-by-one via an adaptor device to an I/O connector of a terminal, wherein said terminal is connected to said central computer via a telecommunications line, wherein the caller is identified by keying in a personal password using the keyboard of said terminal, and wherein the transfer of said data into said taximeter is called to take place by the caller pressing an appropriate key on the terminal.

In a preferred embodiment, the data transmitted from said central computer to said terminal is transmitted in the form of packets of ASCII data, and said adaptor includes a microprocessor which is programmed to recognize the nature of the packets of data coming from the I/O connector of said terminal in order to transcode said packets and transmit them to said taximeters in the code and using the dialog protocol which corresponds to each taximeter.

Advantgeously, each adaptor includes a non-volatile memory in which a secret code number specific to said adaptor is recorded, wherein a correspondence table is recorded in the memory of the central computer relating the personal passwords of persons authorized to use an adaptor with the secret number of said adaptor, and wherein the central computer which receives a call accompanied by the password of the caller determines the appropriate adaptor secret code number and sends said code number in hidden form in a check byte accompanying each packet of information, with said microprocessor being programmed to decode the code number hidden in said check byte, to compare it with its own code number, and to execute orders received from the central computer only if the two numbers match.

The present invention also provides an adaptor for entering data into electronic taximeter by means of a terminal which is temporarily connected to a central computer via a switched telecommunications and data transmission network, the adaptor comprising a microprocessor, an I/O connector connected to the I/O connector of said terminal, and an I/O terminal for connection to said taximeters, one-by-one, said microprocessor being programmed to recognize the nature of packets of information received from said central computer in the code appropriate to said network, to transcode said data into the code suitable for said taximeter, and to dialog with said taximeter using the dialog protocol appropriate thereto.

Advantageously, an adaptor device according to the invention also includes a non-volatile memory having a secret code specific to the adaptor recorded therein, said central computer having a correspondence table in its memory relating user passwords with the secret codes of the adaptors used by said users, and each time the central computer sends a packet of information at the request of a user, it incorporates the corresponding secret code in hidden form, and said microprocessor is programmed to decode the code hidden in the packet of information and to compare it with said secret code.

The invention makes it possible to program a very large number of taximeters situated in different towns from a single central computer, which computer is easily kept under surveillance by the official body in charge of taximeters.

The adaptors required for connecting taximeters to a terminal are very simple devices and they are much cheaper than programming boxes. In addition, since a code is stored in each adaptor, which code is kept secret and is transmitted in each message in hidden form, the method of the invention makes it possible to avoid frauds based on using the network to access the central computer since only the central computer knows the secret code of each adaptor and the passwords associated with the persons authorized to use the adaptor in question.

BRIEF DESCRIPTION OF THE DRAWINGS

An implementation of the invention is described by way of example with reference to the accompanying drawings, in which:

FIG. 2 is a block diagram of the essential components of an adaptor in accordance with the invention.

DETAILED DESCRIPTION OF THE PREFERRED EMBODIMENTS

Figure 1:
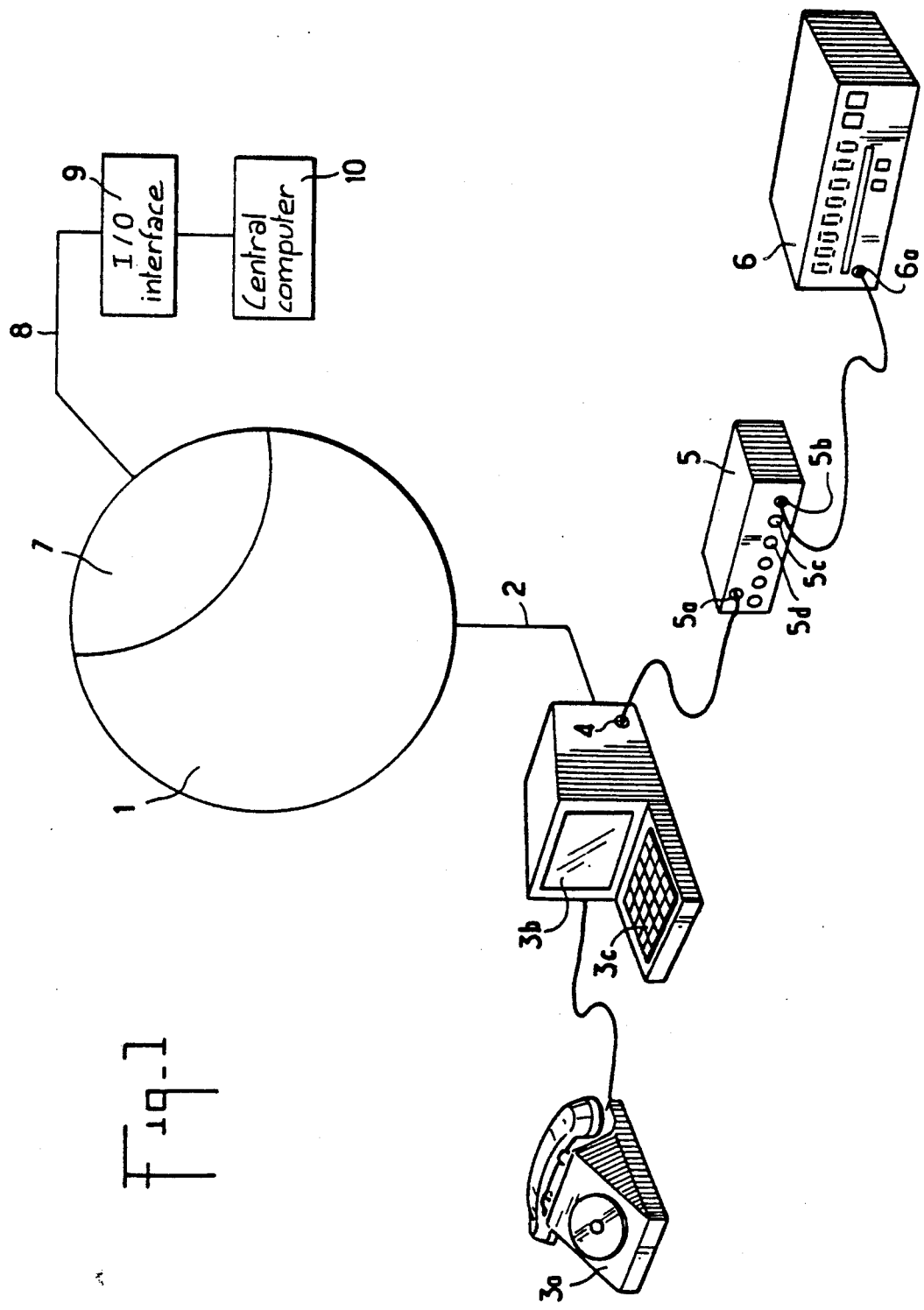
FIG. 1 is an overall diagram of an installation for implementing the method of the invention.

FIG. 1 is a highly diagrammatic representative of an installation suitable for implementing the method of the invention.

Reference 1 represents a switched telecommunications network enabling two subscriber stations to be interconnected, e.g. the public telephone network.

Reference 2 designates a subscriber line, connected, for example, to the premises of a taximeter installer who has a telephone set 3a associated with a terminal 3b which is connected to the telephone line via a modem. The terminal may be constituted by a small computer fitted with an appropriate interface connecting it to the network line. The terminal 3b includes a keyboard 3c enabling alphanumeric characters to be entered into the terminal. It also includes an I/O connector 4 intended, for example, for connection to a printer.

Reference 5 designates an adaptor including a first connector 5a connected to the connector 4, and one or more second connectors 5b, 5c, 5d, . . .

Electronic taximeters 6 each equipped with an I/O connector 6a are connected one-by-one via their connectors 6a to respective ones of the connectors 5b, 5c, 5d, . . . which are selected to match the type or make of the taximeter.

Reference 7 represents a digital data transmission network such as the TRANSPAC network, which is connected to the telecommunications network 1.

Reference 8 represents a line connecting the data transmission network 7 to an I/O interface 9 belonging to a central computer or server whose memory stores updated charging data for the purpose of transferring said charging data into electronic taximeters 6.

Each taximeter installer approved by the responsible official body has a terminal 3b together with a personal access code enabling the installer to connect the terminal to the central computer 10 via telephone line 2 and the data network 7, thereby setting up an interactive dialog with the central computer by means of the keyboard 3c.

Unit taxi charges vary from one town to another, and the memory of the central computer contains the unit prices corresponding to each town in association with a code designating the town, and the calling installer informs the central computer of the code appropriate for the town concerned, thereby enabling the central computer to send data corresponding to that town. Thus, a single central computer can be used for remotely programming all of the taximeters within the jurisdiction of a given official body.

In a preferred implementation, the data transmitted by the central computer is expressed in ASCII (American Standard Code for Information Interchange) which is suitable for encoding letters, digits, and all other common printable characters using 8-bit bytes, which bytes are transmitted serially in the form of packets. Each packet may comprise, for example, the following, in order:

(1) The number or "hash" symbol (ASCII code 35 decimal) indicating the beginning of a data packet and reserved for this purpose;

(2) A header of one or more bytes defining the nature of the following information, for example an instruction to be performed by the adaptor, or orders that the adaptor is to transmit to the taximeter, or data which is to be transmitted to the taximeter;

The header also includes a combination of three ASCII characters defining the number of characters to follow;

(3) n characters representing the data to be transmitted or instructions to be performed; and (4) A cyclic redundancy check code for verifying that the information is uncorrupted, and which may be constituted, for example, by the sum of the most significant bits of all of the characters of data or instructions plus, advantageously, a number which corresponds to the code number specific to the adaptor.

The packets of information received from the central computer cannot be transferred directly to the taximeters. The adaptor 5 serves to analyze these packets of information in order to recognize their natures (instructions to be executed, instructions to be transmitted, data to be transmitted) and in order to transcode them in order to be able to transfer them to taximeters using a code and a dialog protocol appropriate to taximeters and which varies depending on the taximeter manufacturer and also possibly depending on the specific model, when a single manufacturer makes several different models.

FIG. 2 represents an adaptor apparatus 5 in accordance with the invention.

The adaptor comprises a microprocessor 11 associated with a central working memory and connected to a non-volatile memory 12 which contains a secret code specific to each adaptor. It includes an I/O connector 5a for connection to the connector 4 of the terminal and which is connected to the microprocessor via an interface 15.

It also includes a plurality of I/O connectors 5b, 5c, 5d, ... which are connected to the microprocessor via respective interfaces 16b, 16c, 16d, ....

The taximeters are connected one-by-one to the connectors 5b, 5c, 5d, ... which correspond to the type of taximeter.

One of the problems related to reprogramming taximeters from a central computer is the problem of avoiding fraud that could be committed by a non-authorized person possessing a terminal and an adaptor and knowing the numbers for obtaining the central computer.

To this end, each adaptor is fitted, as explained, with a non-volatile memory 12 which contains a secret code specific to the adaptor.

A single adaptor may be used by several different authorized persons each having a different password.

Any person calling the central computer in order to program a taximeter sends their own password to the central computer via the keyboard 3c.

The computer memory contains a table showing the correspondence between user passwords and the secret codes of the adaptors that each user is authorized to use.

When the central computer has received the password from a user, the central computer looks up the appropriate adaptor secret code and when it sends a packet of information, it places this secret number in hidden form in the check byte at the end of the packet of information.

The secret code number of the adaptor never appears in the clear so it cannot be found and even the users of a given adaptor do not know what its secret code is.

The microprocessor 11 in each adaptor is programmed to decode the secret code number which may appear, for example, in a sum or in a product with some other number that the microprocessor is capable of calculating from the packet of information which it receives.

The microprocessor 11 is programmed to compare the decoded secret code with the code written in its memory 12. If the codes match, then the instruction received are performed and the data to be transmitted to the taximeter 6 is indeed transmitted. Otherwise, the microprocessor does not perform the instructions it receives.

The central computer may send instructions to the adaptor, for example it may instruct the adaptor to reset all of the circuits and memories of the adaptor to zero, or else to reset the memories in the taximeter to zero, or verify various taximeter functions, for example the voltage of the battery used to back-up the non-volatile working memory, or it may instruct the adaptor to transmit the number of the taximeter to the central computer. In this case, the adaptor interrogates the taximeter and then transcodes its number into ASCII which it sends to the central computer in the form of a data packet. If the adaptor receives data to be forwarded to the taximeter, said data is preceded by a storage address. The adaptor uses a dialog protocol appropriate to each specific taximeter for transmitting the instruction that it is to receive data bytes and store them in its memory starting at the specific address.

The transmission of data over a network such as the TRANSPAC network requires that the data to be transmitted in network code in the form of data packets.

The adaptor which is interposed between the terminal and the taximeters and which includes a microprocessor, constitutes an intermediate member making it possible for dialog with each taximeter to take place in accordance with a dialog protocol specific to that taximeter and using a code which is appropriate to the taximeter, which code may differ from that used on the network.

I claim:

1. A method of entering data, in particular charging data, into electronic taximeters, wherein a table of said data corresponding to various different towns is recorded in the memory of a central computer which is accessible over a telecommunications network, wherein taximeters are connected one-by-one via an adaptor device to an I/O connector of a terminal, wherein said terminal is connected to said central computer via a telecommunications line, wherein the caller is identified by keying in a personal password using the keyboard of said terminal, and wherein the transfer of said data into said taximeter is called to take place by the caller pressing an appropriate key on the terminal.

2. A method according to claim 1, wherein the data transmitted from said central computer to said terminal is transmitted in the form of packets of ASCII data, and said adaptor includes a microprocessor which is programmed to recognize the nature of the packets of data coming from the I/O connector of said terminal in order to transcode said packets and transmit them to said taximeters in the code and using the dialog protocol which corresponds to each taximeter.

3. A method according to claim 1, wherein each adaptor includes a non-volatile memory in which a secret code number specific to said adaptor is recorded, wherein a correspondence table is recorded in the memory of the central computer relating the personal passwords of persons authorized to use an adaptor with the secret number of said adaptor, and wherein the central computer which receives a call accompanied by the password of the caller determines the appropriate adaptor secret code number and sends said code number in hidden form in a check byte accompanying each packet of information, with said microprocessor being programmed to decode the code number hidden in said check byte, to compare it with its own code number, and to execute orders received from the central computer only if the two numbers match.

4. An adaptor for entering data into electronic taximeter by means of a terminal which is temporarily connected to a central computer via a switched telecommunications and data transmission network, the adaptor comprising a microprocessor, an I/O connector connected to the I/O connector of said terminal, and an I/O terminal for connection to said taximeters, one-by-one, said microprocessor being programmed to recognize the nature of packets of information received from said central computer in the code appropriate to said network, to transcode said data into the code suitable for said taximeter, and to dialog with said taximeter using the dialog protocol appropriate thereto.

5. An adaptor according to claim 4, further including a nonvolatile memory having a secret code specific to the adaptor recorded therein, said central computer having a correspondence table in its memory relating user passwords with the secret codes of the adaptors used by said users, and each time the central computer sends a packet of information at the request of a user, it incorporates the corresponding secret code in hidden form, and said microprocessor is programmed to decode the code hidden in the packet of information and to compare it with said secret code.

* * * * *